United States Patent
Yang

(10) Patent No.: US 7,382,727 B2
(45) Date of Patent: Jun. 3, 2008

(54) SYSTEM AND METHOD FOR ASYMMETRICAL BANDWIDTH MANAGEMENT

(75) Inventor: Xuechen Yang, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 697 days.

(21) Appl. No.: 09/790,437

(22) Filed: Feb. 21, 2001

(65) Prior Publication Data

US 2002/0114334 A1 Aug. 22, 2002

(51) Int. Cl.
*H04L 12/54* (2006.01)

(52) U.S. Cl. .................. 370/232; 370/235.1

(58) Field of Classification Search ........... 370/395.21, 370/229–235.1, 401, 466, 469
See application file for complete search history.

(56) References Cited

U.S. PATENT DOCUMENTS

| | | | | |
|---|---|---|---|---|
| 5,313,454 A | * | 5/1994 | Bustini et al. | 370/231 |
| 5,455,825 A | * | 10/1995 | Lauer et al. | 370/413 |
| 6,233,226 B1 | * | 5/2001 | Gringeri et al. | 370/252 |
| 6,408,005 B1 | * | 6/2002 | Fan et al. | 370/412 |
| 6,424,624 B1 | * | 7/2002 | Galand et al. | 370/231 |
| 6,512,743 B1 | * | 1/2003 | Fang | 370/232 |
| 6,538,989 B1 | * | 3/2003 | Carter et al. | 370/229 |
| 6,931,025 B1 | * | 8/2005 | Masuda | 370/466 |
| 7,072,295 B1 | * | 7/2006 | Benson et al. | 370/230 |
| 2004/0042400 A1 | * | 3/2004 | Horlin et al. | 370/232 |

OTHER PUBLICATIONS

An approach for traffic characterization in generalized processorsharing networks; Barta, P. Nemeth, F. Szabo, R. Biro, J. High Speed Networks Lab., Budapest Univ. of Technol. & Econ.; This paper appears in: Communications, 2001. ICC 2001. IEEE International Conference on Publication Date: 2001; vol. 2, On pp. 625-629 vol. 2 Meetin.*

Call admission control in generalized processor sharing (GPS)schedulers using non-rate proportional weighting of sessions Szabo, R. Barta, P. Nemeth, F. Biro, J. Perntz, C.-G. Dept. of Telecommun. & Telematics, Tech. Univ. Budapest; This paper appears in: INFOCOM 2000. Nineteenth Annual Joint Conference of the IEEE Computer and Communi.*

On the performance of bursty and modulated sources subject to leakybucket rate-based access control schemes Sohraby, K. Sidi, M. Comput. Sci. Telecommun. Program, Missouri Univ., Kansas City, MO; This paper appears in: Communications, IEEE Transactions on Publication Date: Feb./Mar./Apr. 1994 vol. 42, Issue: 234, Part 1 On pp. 477-487.*

Congestion control through input rate regulation; Sidi, M. Liu, W.-Z. Cidon, I. Gopal, I.; IBM Thomas J. Watson Res. Center, Yorktown Heights, NY; This paper appears in: Communications, IEEE Transactions on Publication Date: Mar. 1993 vol. 41, Issue: 3 On pp. 471-477.*

* cited by examiner

*Primary Examiner*—Hassan Kizou
*Assistant Examiner*—Salman Ahmed
(74) *Attorney, Agent, or Firm*—MacPherson Kwok Chen & Heid LLP.; Tom Chen

(57) ABSTRACT

System and method for allocating and managing a shared Internet access channel on an Internet access device. The system and method prioritize data flow in a multi-user, limited bandwidth networking environment by differentiating data types for disparate processing thereof by which a plurality of aggregation classes are hierarchically ordered to include at least one favored class (bandwidth guaranteed) and at least one disfavored class (best effort). Network sessions are aggregated into these classes according to an aggregation policy and bandwidth is asymmetrically allocated to the sessions according to a plurality of algorithms operating in conjunction with the hierarchy.

38 Claims, 10 Drawing Sheets

SYSTEM AND METHOD FOR ASYMMETRICAL BANDWIDTH MANAGEMENT

CROSS-REFERENCES TO RELATED APPLICATIONS

Not applicable.

STATEMENT REGARDING FEDERALLY SPONSORED RESEARCH OR DEVELOPMENT

Not applicable.

MICROFICHE APPENDIX

BACKGROUND OF THE INVENTION

1. Field of the Invention

The present invention relates generally to networking environments in which one or more Network Access Devices compete for limited Network Access Channels; more specifically, it relates to allocating and managing bandwidth, for example, for shared Network Access Channels on a local area network ("LAN").

2. Description of Related Art

Referring now to the drawings, FIG. 1 depicts a simplified networking environment 10 which illustrates in a preferred embodiment of the present invention. More specifically, one or more computers 12, 14, 16, 18, . . . initiate one or more respective network sessions 20, 22, 24, 26, . . . with a communications network such as the Internet 28. Representative network sessions 20, 22, 24, 26, . . . include web browsing sessions, electronic mail ("e-mail") sessions, file transfer protocol ("FTP") sessions, and video streaming ("VS") sessions, among others. Each session involves sending and receiving one or more data packets as part of the network session 20, 22, 24, 26, . . . with one or more other computers (not shown) similarly connected to the networking environment 10.

While the Internet 28 spans the globe, its network of networks connect to one another via electronic pathways that facilitate exchanges of information, files, and other types of data that are transferred through the network sessions 20, 22, 24, 26, . . . . To be "connected" to the Internet 28 means that a computer 12, 14, 16, 18, . . . has access to these electronic pathways. In nearly every networking environment 10, the computers 12, 14, 16, 18, . . . share one or more common Network Access Channels ("NAC") 30 at a shared Network Access Device ("NAD") 32 or other network gateway. Known NACs include, for example, a T-1 or digital subscriber line ("DSL"). Known NADs include, for example, cable modes, wireless devices, and other similar devices.

Data packets flow along the electronic pathways according to various well-known protocols, such as the Transmission Control Protocol ("TCP") and Internet Protocol ("IP"). While the IP functions route the data packets to specified destinations, the TCP functions to break down and reassembles them at respective senders and receivers. Most data transfers over the Internet 28 employ TCP/IP because the Internet 28 is a packet-switched communications network, meaning there are no single, unbroken connections between senders and receivers. Instead, when information is broken down into small data packets for transmission, each individual packet is commonly sent over a different pathway, all at approximately the same time. Because the packets traverse different paths, they commonly arrive out of order. In circuit-switched networks, on the other hand, such as traditional phone lines, a specific part of the network is dedicated in its entirety to a particular sender and receiver as long as a connection therebetween is maintained; in these circuit-switched networks, individual data packets are sent and received sequentially.

A common networking environment 10 can be connected in numerous ways. For example, LANs often join regional networks (e.g., a wide area network ("WAN")) in order to provide better service and maximize efficiencies. A variety of leased lines commonly connect LANs to WANs and WANs to the World Wide Web ("WWW"). These leased lines may include a single telephone line or a complex fiber-optic cable having microwave linking and satellite transmission capabilities. High-speed "backbones" and other high-capacity lines carry enormous amounts of traffic across the network 10, such as the very high-speed backbone network service ("vBNS").

When information is broken into data packets according to the TCP for transmission, the packets commonly travel from a LAN through the many levels of the network 10. Various hardware and software components, including hubs, bridges, gateways, repeaters, and routers, process the packets and ensure their delivery at specified destinations. Hereinafter, such components will be referred to as head-end devices ("HED") 34, although they are not intended to be limited to such. Like NADs 32, HEDs 34 commonly share one or more NACs such as, for example, a DSL Access Multiplexer (DSLAM) or Asynchronous Transfer Mode ("ATM") Data Switch.

It is often difficult for NADs 32, which allocate and manage upstream traffic, to predict or control the download/arrival rate of data packets from the Internet 28. As a result, the NAD 32 is commonly unable to allocate an efficient amount of bandwidth from the total amount of bandwidth available across its NAC 30. This problem arises because WAN links between NADs 32 and HEDs 34 have limited bandwidth. Thus, for upward traffic sent from a LAN to the Internet 28, congestion traffic traditionally occurs at the NAD 32 whenever the bandwidth required for the data packet's transmission exceeds the available WAN link bandwidth.

Similarly, it is often difficult for HEDs 34, which allocate and manage downstream traffic, to predict or control the upload/serving rate of data packets from a LAN. As a result, the HED 34 is commonly unable to allocate an efficient amount of bandwidth from the total amount of bandwidth available across its NAC 36. This problem arises because WAN links between NADs 32 and HEDs 34 have limited bandwidth. Thus, for downward traffic sent from the Internet 28 to a LAN, congestion traffic traditionally occurs at the HED 34 whenever the bandwidth required for the data packet's transmission exceeds the available WAN link bandwidth.

For example, if a network session 20, 22, 24, 26, . . . requires a certain amount of bandwidth for successful transmission, the traditional NAD 32 has no mechanisms with which to control the HED 34 or monitor congestion at the network 10. As a result, overburdened HEDs 34 commonly drop data packets before transmitting them to NADs 32. More specifically, if a specific NAD 32 is configured for a 512 Kb/sec SV transfer at the same time another user downloads one or more large files in a FTP network session, the HED 34 could be forced to compromise both data transmissions to the NAD 32. Even if the NAD 32 confined the FTP session to ensure sufficient local bandwidth for the SV network session, present-day NADs 32 lack the power to effectively control and monitor traffic congestion at the HED 34.

In addition, most NADs 32 and HEDs 34 regard each data packet as equally important regardless of the host that sent the packet or the network session 20, 22, 24, 26, . . . to which the packet belongs. These devices traditionally have only one input queue and only one output queue for both directions. When a data packet comes in, for example, the NAD 32 appends it at the end of its input queue where it waits to be forwarded with other data packets. While this traditional algorithm sufficed when there were only a few best-effort protocols in use, such as FTP and SMTP, it is less sufficient as increased digital content is shared within the networking environment 10 and delivered via the many different multimedia-streaming protocols that are available today. These multimedia-streaming protocols, such as Video Conferencing and Voice-over-IP applications, commonly require consistent downloading rates, delays, and delay jitters. Furthermore, even for best-effort protocols, more and more business users demand differentiation and prioritization between different types of network traffic. For example, on-line transactions may require preferential treatment over regular web-browsing sessions.

As a result of the problems and shortcoming typified by the foregoing, even small outgoing traffic bursts can abuse bandwidth allocations at the NAD 32 and HED 34. Moreover, most traditional NADs 32 and HEDs 34 employ identical algorithms to predict respective download/arrival rates and upload/serving rates.

While numerous efforts have been aimed at solving these problems and shortcomings, most have focused exclusively on Internet-wide solutions, such as Qualify of Service ("QoS"), Differentiated Service ("DiffServ"), different kinds of feedback mechanisms, Admission Control, Resource Reservation, and other scheduling algorithms. Implementation of an Internet-wide solution, however, would require worldwide adoption of the new algorithm or implementation. Even still, such Internet-wide solutions generally fail to differentiate between network sessions that originate from a common host. While several data flows have been prioritized on selective core routers, these solutions still fail to control and allocate the NAC 30.

What is required, then, is a bandwidth management and allocation mechanism that operates on a NAD 32, independently of a HEDs 34. And since NADs 32 and HEDs 34 are usually controlled by different parities, it is also highly desirable to control both the upstream and downstream data flows at a single device. In this way, the bandwidth management and allocation mechanism can be deployed immediately, and it is easier to maintain and upgrade such a mechanism subsequently. Furthermore, business and other entities can decrease independent serviced providers ("ISP") service fees and avoid risking disclosing confidential secerets by implementing bandwidth management solely at their own NAD 32. What is needed therefore, is an accurate system and method for predicting download/arrival rates and upload/serving rates so that bandwidth can be allocated efficiently in limited bandwidth networking environments 10. It is also desirable to reduce or eliminate bursty network traffic and provide prioritized traffic routing according to a port or other number, e.g. a TCP port number. It also remains desirable to allocate available bandwidth among network capable devices based on individualized and customized user requirements.

The foregoing and other objects, advantages, and aspects of the present invention will become apparent from the following description. In the description, reference is made to the accompanying drawings which form a part hereof, and in which there is shown, by way of illustration, a preferred embodiment of the present invention. Such embodiment does not represent the full spirit or scope of the invention, however, and reference must also be made to the claims herein for properly interpreting the spirit and scope of this invention.

BRIEF SUMMARY OF THE INVENTION

The present invention provides a system and method for controlling data flow in a multi-user, limited resource networking environment by differentiating data types for disparate treatment. It enables bandwidth management functionality by aggregating incoming and outgoing traffic whereby network traffic is prioritized based on individualized or user-configurable requirements. By controlling data flow at a NAD, data flow across the entire networking environment can be effected.

The invention comprises a system and method for aggregating network sessions based on a plurality of aggregation classes, including a favored and disfavored class. The systems and methods provide means for allocating bandwidth based on a hierarchy of aggregation classes. They correlate upstream and downstream data flows whereby data flow in one direction disables data flow in the other direction. The inventive arrangements control arrival rates by controlling serving rates; they dynamically calculate serving/arrival ratios, adjust token generation rates, and prioritize within the favored and disfavored classes.

One embodiment of the present invention provides a system and method for controlling the serving rate for the favored and disfavored classes. It implements different schedulers and scheduling algorithms for the different data types. It uses pre-defined protocol knowledge to determine bandwidth allocations for recognized network sessions and tracks traffic history or control policies to determine bandwidth allocations for unrecognized network sessions. The inventive arrangements also provide novel means for adjusting internal scheduling priorities and queuing buffers.

DETAILED DESCRIPTION OF THE INVENTION

For illustrative and convenience purposes only, the present invention has been described primarily in the context of implementing the inventive arrangements within a NAD 32. However, nothing in this description is intended to be limited thereto, as the inventive arrangements could also be implemented, for example, on HEDs 34 or other devices not otherwise related to the Internet but nevertheless falling within the spirit of the invention.

Figure 1:
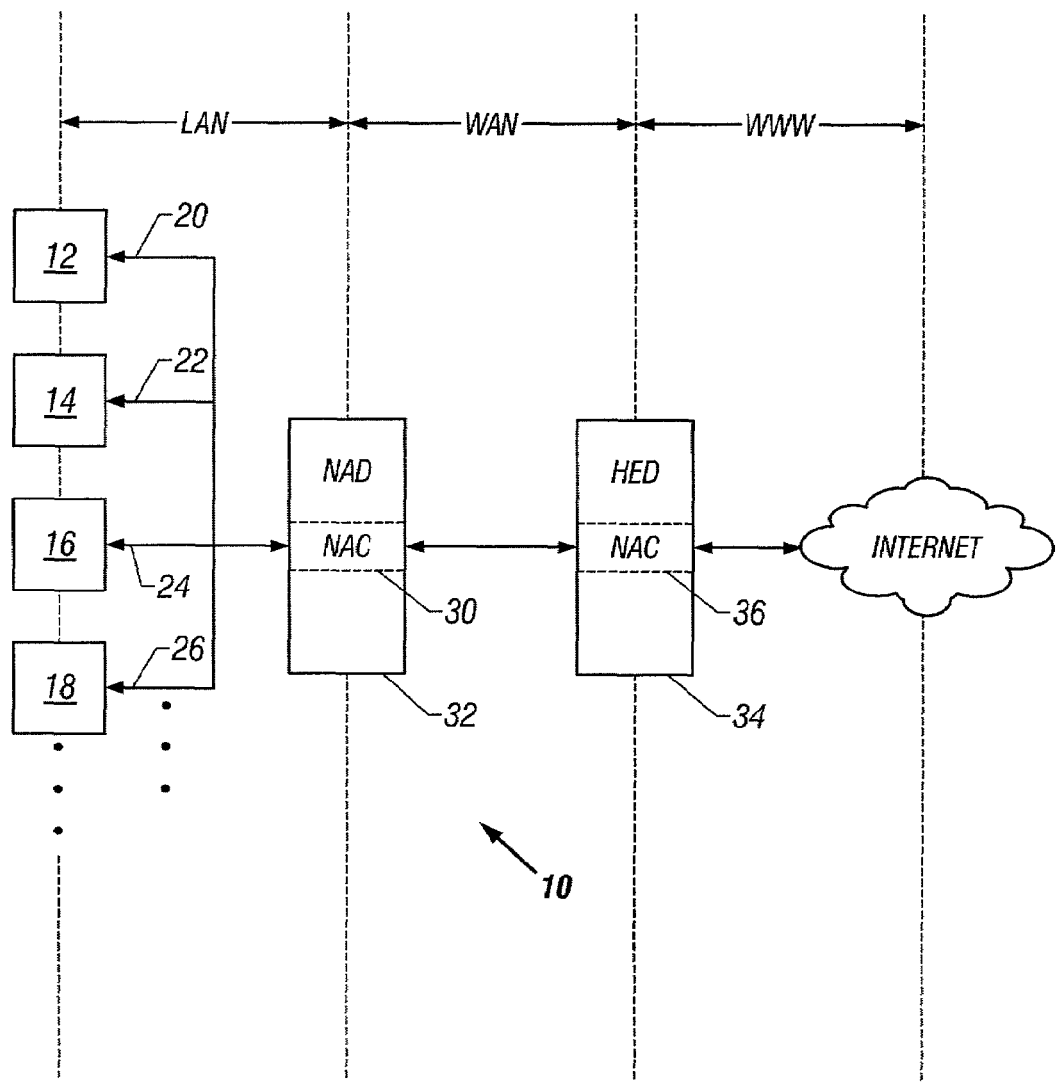
FIG. 1 illustrates a simplified networking environment 10 in which a preferred embodiment of the present invention may be practiced.

Referring generally to FIG. 1, the NAD 32 is configured to establish a plurality of aggregation classes, including at least one favored class (e.g., a guaranteed-bandwidth class) and at least one disfavored class (e.g., a best-effort class). In a preferred embodiment, known NADs include, for example, cable modes available from Motorola, Inc., wireless devices available from Broadcom Corporation, customer premise equipement receivers, and other devices programmed to achieve the following functionality.

The plurality of aggregation classes are hierarchically ordered with the guaranteed-bandwidth class receiving preferential status over the best-effort class regarding bandwidth allocation. Network sessions that are aggregated within the different aggregation class will share the NAC 30 bandwidth according to the hierarchical ordering. One or more scheduling policies, as elaborated upon below, are defined to ensure the fairness of the bandwidth allocation for each aggregation class within the hierarchy. A preferred embodiment of the invention allocates a fixed amount of bandwidth to each of the aggregation classes. In another preferred embodiment, different types of network sessions may be further prioritized by further subdivision within each class.

While each active network sessions is aggregated within at least one of the aggregation classes, network sessions that can be aggregated into multiple aggregation classes are preferably aggregated along with the highest aggregation class for which that session is otherwise qualified. Aggregating each network session into the appropriate aggregation classes is accomplished in accordance with a pre-defined aggregation policy, which preferably aggregates classes by matching source IP addresses, destination IP addresses, transport types, port numbers, and the like. These and other aggregation criterion comprising the aggregation policy be used separately or together, and in a preferred embodiment, may be based on individualized and customized user requirements. The NAD 32 then employs a scheduling algorithm to serve the incoming and outgoing data packets of a particular network session. An aggregation class is the smallest unit within a scheduling algorithm. To ensure bandwidth allocation fairness, the scheduling algorithm may allocate the bandwidth among all the aggregation classes equally. In an alternative embodiment, different weighted values are associated with the different aggregation classes according to relative priority preferences and different resource requirements. The invention allows the NAD 32 to guarantee an average rate in one embodiment and a minimum rate in an alternative embodiment. In operation, the network sessions may consume additional bandwidth that remains unallocated in addition to the guaranteed rate when the minimum rate is guaranteed. The foregoing will be explained presently.

Figure 2:
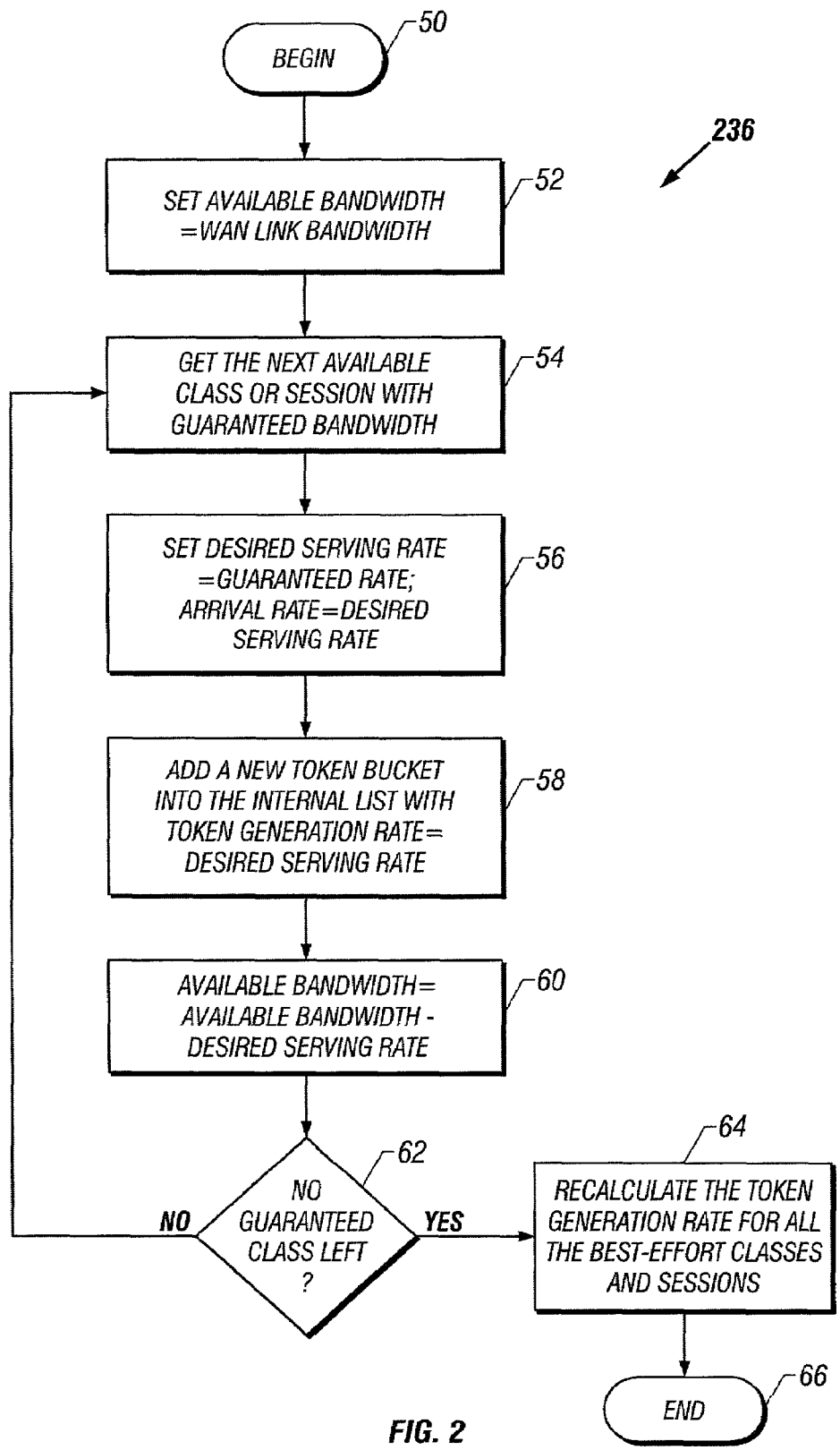
FIG. 2 is a flow chart depicting a preferred process for allocating NAC bandwidth among a plurality of aggregation classes and calculating associated token generation rates.

Referring now to FIG. 2, a flow chart depicting a preferred process for allocating NAC 30 bandwidth among aggregation classes and calculating associated token generation rates is illustrated. More specifically, the NAD 32 employs the FIG. 2 algorithm to allocate channel bandwidth among the aggregation classes. In a preferred embodiment, available bandwidth corresponds to the bandwidth of the current WAN. For example, a symmetric digital subscriber line ("SDSL") of an ISP may maintain 1.5 Mb/sec upstream and downstream according to a service-level agreement. Regardless, FIG. 2 illustrates the preferred embodiment for allocating the total available bandwidth among the aggregation classes.

In FIG. 2, the NAD 32 first satisfies the bandwidth requirements of the network sessions aggregated into the favored class, and then allocates the remaining bandwidth, if any, to the network sessions aggregated into the disfavored class. Thus, the combination of the arrival rate of all of the each aggregation classes will be less than or equal to the total available bandwidth, and the combination of the bandwidth requirements of the network sessions aggregated into the favored class cannot exceed the total available bandwidth.

For any bandwidth-guaranteed or other favored class, the guaranteed rate is the serving rate, not the arrival rate. Because the arrival rate varies and exceeds the serving rate, the combination of the arrival rate of each of the guaranteed aggregation classes will not exceed the total bandwidth at any given time. In a preferred embodiment, this is maintained by predefining a serving/arrival ratio to predict the arrival rate of the guaranteed class. In a preferred embodiment of the present invention, the serving/arrival ratio of the favored class is pre-determined. In another preferred embodiment of the present invention, 0.75 is the predetermined serving/arrival ratio. Since the serving/arrival ratio only ensures a limit of available bandwidth and is not otherwise used in run-time scheduling or rate control, it may be based on individualized and customized user requirements as determined by a system administrator or other.

According to aspects of the inventive arrangements, the desired arrival rate of the best-effort classes depends on the total arrival rate of the bandwidth-guaranteed classes. Accordingly, the NAD 32 adjusts the serving rate for each of the best-effort classes to control the corresponding arrival rates. Hence the serving rate of a best-effort class varies, while the serving rate of a bandwidth-guaranteed class is generally fixed. To control the serving rate of a class (either best-effort or bandwidth guaranteed), a preferred embodiment of the invention uses a Token Bucket algorithm, as explained below. However, the invention is not to be limited in this regard, as other rate-control algorithms may also be used.

To control the serving rates according to the Token Bucket algorithm, the NAD 32 accesses a token bucket, which is kept in an internal bucket list called a token bucket list. A token bucket comprises a placeholder for tokens. In accordance with this algorithm, the NAD 32 serves data packets in a given class only if the corresponding token bucket contains sufficient tokens. In a preferred embodiment of this invention, this algorithm consumes an amount of tokens corresponding to packet size. Each token bucket has a maximum capacity, which sets a limit on the peak rate for each aggregation class. Also in accordance with a preferred embodiment of the present invention, a timer callback is used to generate tokens for each bucket at a constant rate corresponding to a token generation rate for each class, as elaborated upon in FIG. 4.

In accordance with FIG. 2, the NAD 32 loops through the favored classes and calculates corresponding arrival rates by using the default serving/arrival ratio and the desired serving rate, which is the guaranteed rate. A preferred embodiment of the invention sets the serving/arrival ratio to 1.0 for all of the aggregation classes, this sets the arrival rate to the desired serving rate. The NAD 32 then creates a token bucket with the token generation rate equal to the desired serving rate, and adds the bucket into the global bucket list. At the end of each loop, the NAD 32 then recalculates available bandwidth by subtracting the current value from the arrival rate of the bandwidth-guaranteed class.

As specifically indicated by the FIG. 2 flowchart, the process begins in step 50, and in step 52, the available bandwidth is set to the WAN link bandwidth. Then, in step 54, the NAD 32 obtains the next available network with guaranteed bandwidth, if any, and in step 56, the desired serving rate is set to the guaranteed rate and the arrival rate is set to the desired serving rate. In step 58, a new token bucket is added into the internal list with the token generation rate set to the desired serving rate. In step 60, the available bandwidth is set to the available bandwidth minus the desired serving rate, and according to step 62, the process is continued until there are no guaranteed classes left, in which case control passes to step 64 to recalculate the token generation for all of the best-effort network sessions (see FIG. 3); else control returns to step 54 from step 62.

Figure 3:
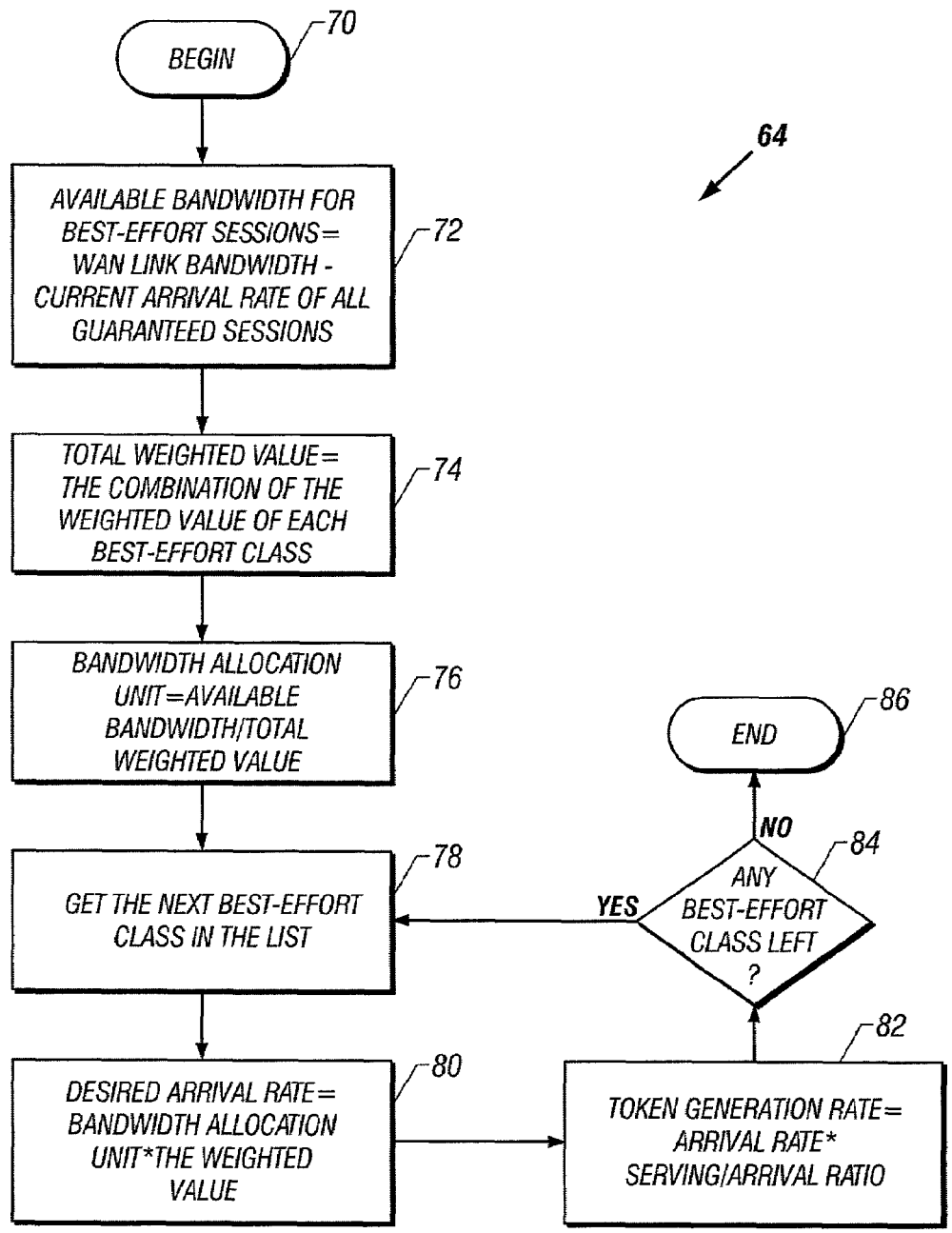
FIG. 3 is a flow chart depicting a preferred process for calculating token generation rates for a disfavored class.

After allocating bandwidth according to the bandwidth-guaranteed classes as illustrated in FIG. 2, the NAD 32 next allocates the unallocated bandwidth among the best-effort classes, as shown in FIG. 3. More specifically, FIG. 3 illustrates a preferred method of allocating bandwidth among the best-effort classes. In this embodiment, the inventive arrangements allow flexibility regarding bandwidth allocations among the different best-effort classes. Since the bandwidth is allocated according to the scheduling algorithms, different scheduling algorithms for the best-effort classes can be implemented. While various best-effort scheduling algorithms can be implemented, a round-robin scheduler algorithm allocates bandwidth equally among the best-effort classes. In an alternative embodiment of the scheduling algorithm, bandwidth is allocated among the best-effort classes using a weighted round-robin scheduling algorithm.

In the weighted round-robin scheduling algorithm, the NAD 32 associates a weighted value with each of the best-effort classes. This weighted value represents the relative importance and priority within the disfavored class. For example, a system administrator or other may set e-mail network sessions to a relative weight of five while setting a relative weight of one for regular WWW browsing sessions. As a result of such a weighted round-robin scheduling algorithm, the serving rate of e-mail traffic would be five times as great as the serving rate for HTTP traffic.

As specifically indicated by the FIG. 3 flowchart, the process begins in step 70 and continues in step 72 by subtracting the combination of the arrival rate of all of the guaranteed classes from the total available bandwidth. Then, in step 74, the total weighted value is calculated according to the combination of the weighted values of each of the best-effort classes. In step 76, the bandwidth allocation unit is the result of dividing the available bandwidth divided by the total weighted value. In step 78, the NAD 32 obtains the next available network with best-effort bandwidth, if any, and in step 80, the desired arrival rate is calculated as the product of the bandwidth allocation unit multiplied by its associated weighted value. Then, in step 82, NAD 32 sets the token generation rate as the product of the arrival rate multiplied by the second serving/arrival ratio. In this way, the token generation rate is derived from the desired arrival rate. In step 84, the process is continued as long as there are best-effort classes to which available bandwidth may be allocated, in which case control returns to step 78. Otherwise, control passes from step 84 to step 86 to terminate the process.

Figure 4:
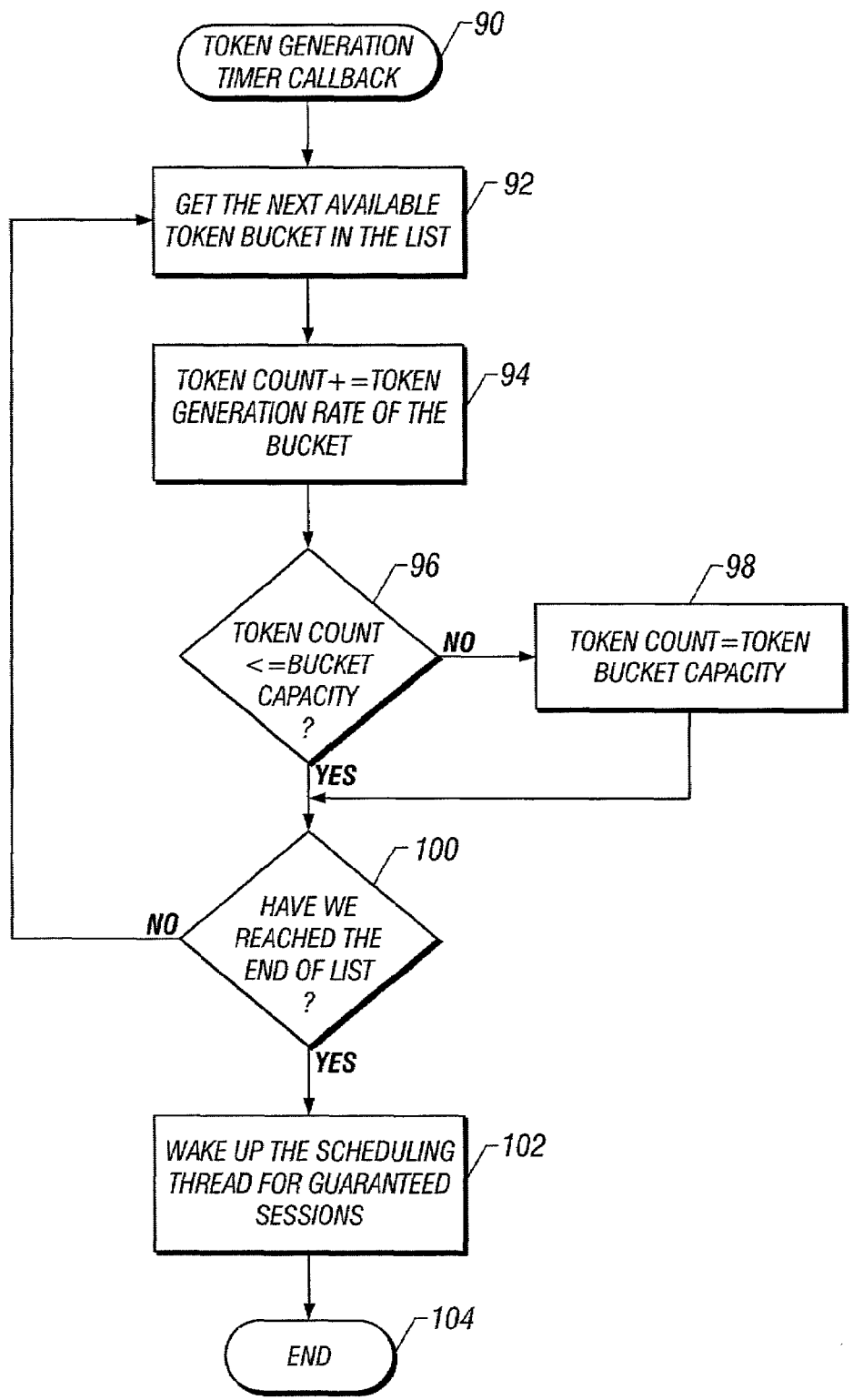
FIG. 4 is a flow chart depicting a preferred process for generating tokens using a general timer callback.

Following generation of the token bucket and corresponding token generation rates for each of the aggregated classes, FIG. 4 illustrates a preferred use of a timer callback function to generate tokens for each bucket in the list. For each token bucket in the list, the timer callback generates a certain amount of tokens. The specific number of tokens generated depends on the calling interval of the timer callback and the pre-calculated token generation rate. Before the timer callback function returns, the token-generation callback preferably activates a scheduling thread for the bandwidth-guaranteed classes. Activation can occur by either generating a sending event or another known interprocess communication ("IPC") technique, as will be elaborated upon presently.

A preferred embodiment of the invention employs two or more threads for scheduling network traffic, including one thread for the best-effort classes and another for the bandwidth-guaranteed classes, wherein the scheduling thread for the guaranteed classes has a higher thread priority than the thread for the best-effort classes. In operation, the guaranteed scheduling thread serves packets in the guaranteed queues as long as there are tokens and packets to be served. In a preferred embodiment, the guaranteed scheduling thread becomes inactive if there are no more tokens or packets to be served. On the contrary, the best-effort scheduling thread serves the best-effort classes continually. In this preferred embodiment, this thread is always active; it runs continuously until interrupted by a thread with a higher priority, such as a guaranteed scheduling thread. As more tokens or packets become available, the guaranteed scheduling thread interrupts the best-effort scheduling thread, temporarily inactivating the latter. The token-generation callback activates the guaranteed scheduling thread as the additional tokens or packets become available.

As specifically indicated by the FIG. 4 flowchart, the process begins in step 90 by activating a token generation call timer callback. Then, in step 92, the next available token bucket in the list is obtained, and in step 94, the token count is set to the token generation rate of the bucket. In step 96, the token count is checked against the bucket capacity, wherein the token count is set to the token bucket capacity if the later is greater than or equal to former in step 98. Regardless, control then passes to step 100 wherein the NAD 32 checks whether the end of the list has been reached, whereby control returns to step 92 if it has not, or otherwise passes to step 102 to activate the scheduling thread for the guaranteed sessions. This process ends in step 104.

Although the scheduling algorithms described above were implemented using two or more threads, the inventive arrangements are not limited in this regard, and could similarly be implemented using other threadless hardware or software architectures. For example, the scheduling algorithms could also be implemented using additional timer callbacks or a hardware interrupt.

Figure 5:
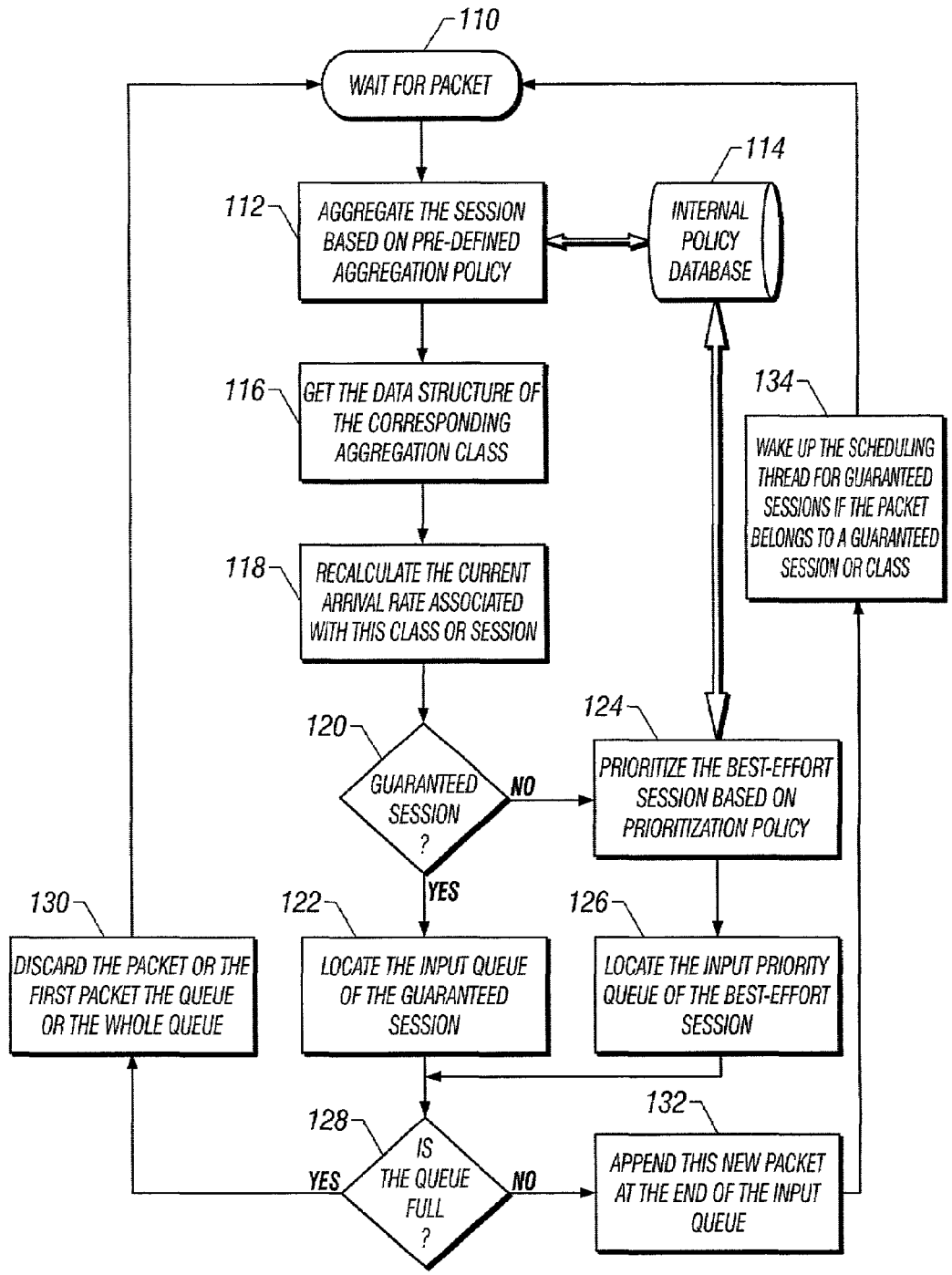
FIG. 5 is a flow chart depicting a preferred process for processing upstream and downstream data packets, and aggregating them according to a pre-defined aggregation policy.

Referring now to FIG. 5, it illustrates a preferred process by which the NAD 32 queues an incoming upstream or downstream data packet from a network session. Based on the previously described aggregation policy, the NAD 32 locates the corresponding aggregation class to which the data packet belongs. Upon receiving each data packet, the NAD 32 recalculates the arrival rate for the current aggregation class. The calculation can be done in many ways. One embodiment of the invention uses the following formula:

$$\text{ArrivalRate} = \alpha * \text{ArrivalRate} + (1-\alpha) * \text{PacketNumber}/\text{TimeSpan}$$

In this formula, $\alpha$ determines how much the previous arrival rate will affect the current arrival rate. A preferred embodiment of the invention sets $\alpha$ to 0.5, although other appropriate values less than one may also be chosen. This embodiment of the invention also sets the TimeSpan, which is used to calculate the recent arrival rate, to 3.0 seconds.

The NAD 32 next allocates the input queue that this data packet belongs to the preferred embodiment of the invention maintains one input queue for the bandwidth-guaranteed classes and multiple queues for the best-effort classes. Because network sessions falling within a best-effort class can be further subdivided into a plurality of disfavored classes within the hierarchical ordering, each disfavored priority is preferably assigned a separate input queue, whereby the best-effort scheduler first serves disfavored queues having relatively higher priorities, then serves disfavored queues having relatively lower priorities. This algorithm is discussed in greater detail below.

Employing traditional buffer and queue management algorithms, the size of a particular input queue generally corresponds to the availability of the system buffers. For example, an incoming data packet is appended to the end of the appropriate input queue in FIG. 5 if that queue is not full. If the input queue is full, the NAD 32 may discard the incoming packet.

As indicated by the FIG. 5 flowchart, a network session begins with the arrival of a data packet in step 110. In step 112, the network session is aggregated into an aggregation class based on the pre-defined aggregation policy, which is preferably stored in an internal policy database 14 or elsewhere. In step 116, the NAD 32 obtains the data structure of the corresponding aggregation class, and in step 118, recalculates the current arrival rate associated with this particular network session. In step 120, a decision is made whether the network session is favored (in which case control passes to step 122 to locate the input queue of the guaranteed session) or disfavored (in which case control first passes to step 124 to prioritize the disfavored class according to the pre-defined prioritization policy, and then to step 126 to locate the input priority of the best-effort session). Then, from step 128, control passes either to step 130 to discard the packet, discard the first packet in the queue, or discard the entire queue, as implemented by a traditional queue management algorithm if the queue is full, or to step 132, to append the data packet at the end of the appropriate input queue. If the data packet was aggregated into a favored aggregation class, then the guaranteed scheduling thread is activated in step 134, and either from step 130 or step 134, control is returned to step 110 to await the arrival of a next network session.

Figure 6:
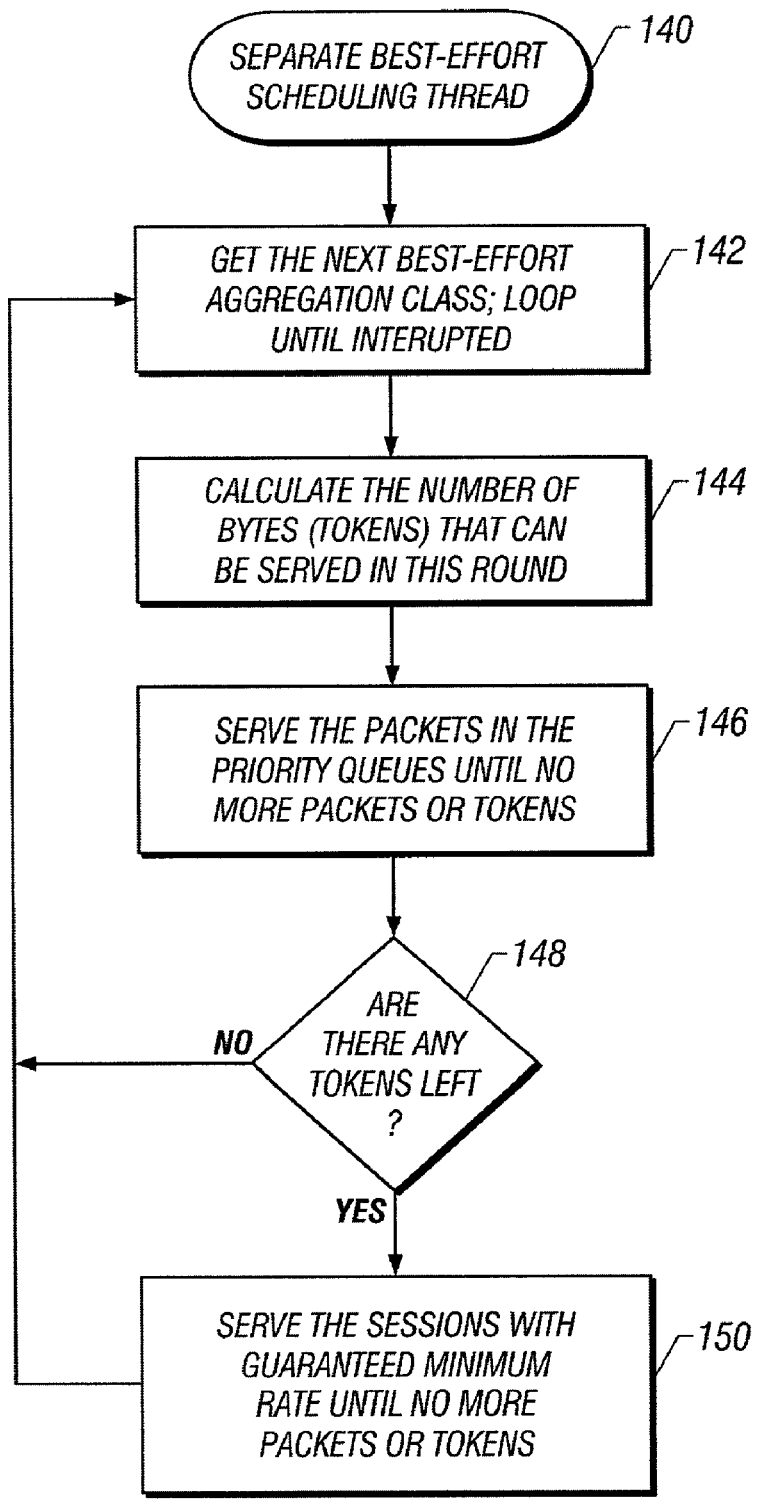
FIG. 6 is a flow chart depicting a preferred process for scheduling priority queues contained in the disfavored class using a round-robin scheduling algorithm.

FIG. 6 illustrates one method of implementing the best-effort scheduling thread. After the thread is created, the scheduler enters a continuous loop of serving best-effort session packets, each loop corresponding to a round in the previously-discussed round-robin algorithms. For each of the best-effort aggregation classes, the scheduler calculates the number of tokens available for the class. This step is otherwise unnecessary in the embodiment of the invention wherein the number of tokens is the same number as the number of tokens in the corresponding token bucket.

At the end of each round in which additional tokens remain for the current best-effort classes, the scheduler can use those tokens to serve the aggregation classes that have guaranteed minimum rates. Heretofore, the described inventive arrangements have been implemented using the two aggregation classes of best-effort and bandwidth-guaranteed. In an alternative embodiment, two types of bandwidth-guaranteed classes can be implemented, including a bandwidth-guaranteed average rate and a bandwidth-guaranteed minimum rate. In such an embodiment, the later class can be served not only with bandwidth-guaranteed scheduler, but also with the best-effort scheduler by consuming whatever tokens remain after serving the best-effort classes.

As indicated by the FIG. 6 flowchart, a network session begins in step 140 with a separate best-effort scheduling thread. In step 142, the NAD 32 obtains the best-effort aggregation class and loops continually until interrupted. Then, in step 144, the number of tokens that can be served in this round is calculated, and in step 146, the data packets in the priority queues are served until there are no more data packets (see FIG. 7). Then, if there are no additional tokens after step 148, control returns to step 142 for processing the next best-effort aggregation class; otherwise, the sessions with guaranteed minimum rates are served until there are no more tokens in step 150 before returning to step 142.

Figure 7:
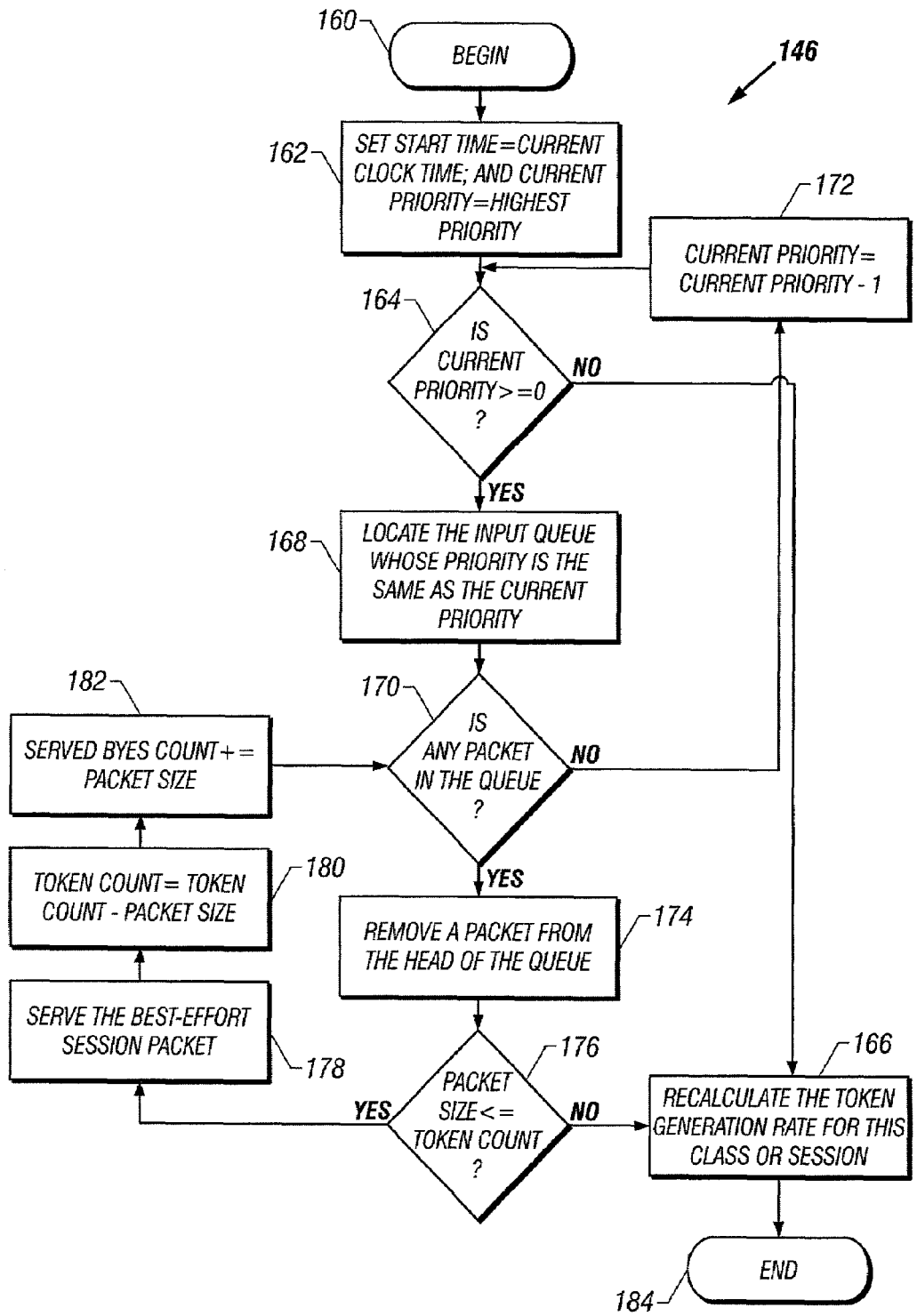
FIG. 7 is a flow chart depicting a preferred process for serving data packets within multiple priority queues in the disfavored class.

FIG. 7 illustrates a preferred method for serving data packets of multiple priority queues within each best-effort class. It also illustrates a preferred embodiment in which a best-effort class is served within each weighted round-robin scheduling round. As previously elaborated upon, this embodiment allows additional prioritization within each of the best-effort aggregation classes. While each level of priority preferably corresponds to a separate input queue, all of the priority queues preferably share the token bucket associated with current class. The best-effort scheduler can serve data packets in these queues until there are no more tokens or packets to be served. In this embodiment, the scheduler is programmed to serve the highest priority queues first, and will serve these queues until there are no more tokens or packets therein. Thereafter, the scheduler will serve lower priority queues in likewise fashion based on a relative ranking of the queues.

As indicated by the FIG. 7 flowchart, the process begins in step 160 and continues in step 162 by setting the start time to the current clock time and the current priority to the highest priority. Then, in step 164, if the current policy is greater than or equal to zero, control passes to step 166 to recalculate the token generation rate for this class or session (see FIG. 8). Otherwise, control passes to step 168 to locate an input queue having the same priority as the current policy. Then, control passes from step 170 to step 172 if there are no packets in the queue, in which the current priority is decremented before control is returned to step 164. Otherwise, control passes from step 170 to step 174 if there are packets in the queue, in which case a packet is removed from the head of the queue. Then, control passes from step 176 to step 166 if the packet size is less than or equal to the token count. Otherwise, control passes from step 176 to step 178 to serve the best-effort packet, and then to step 180 in which the token count is set to the token count minus the packet size. Then, in step 182, the served bytes count is set to the packet size, after which control is returned to step 170. Finally, the process ends in step 184 following step 166.

Figure 8:
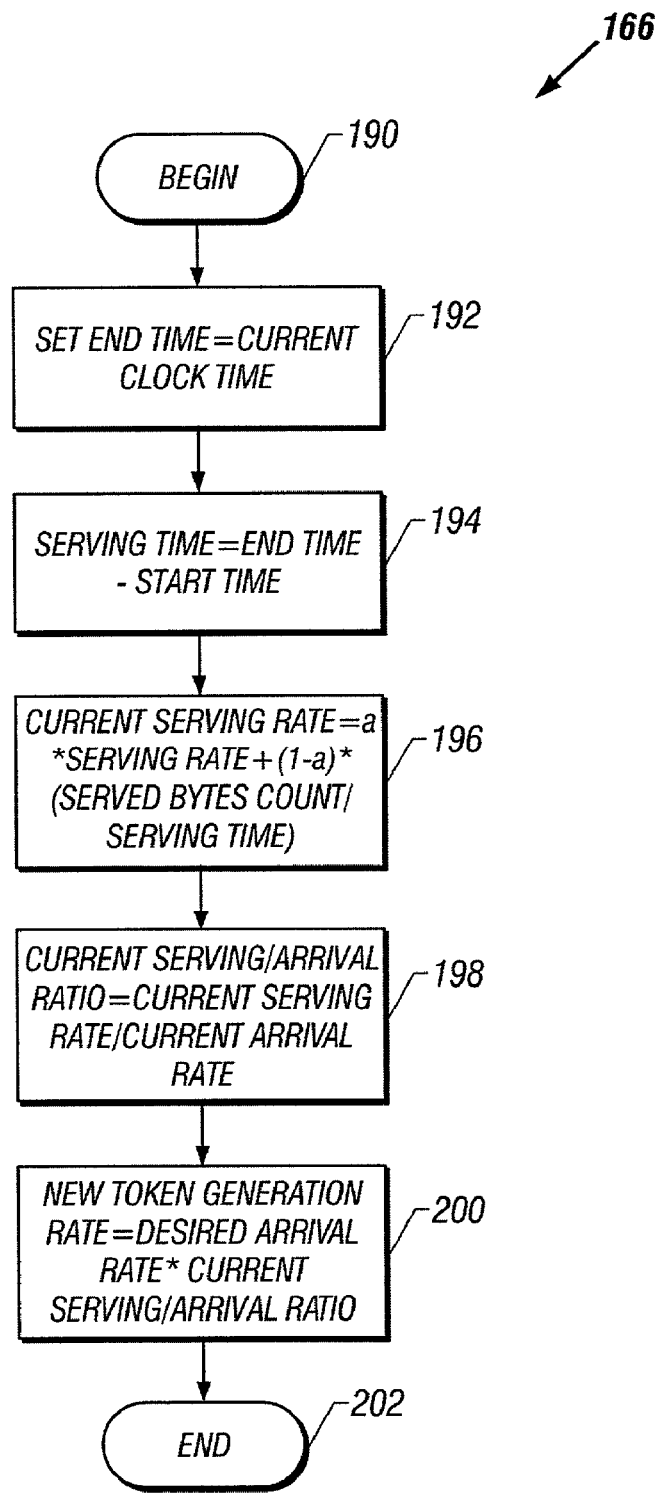
FIG. 8 is a flow chart depicting a preferred process for adjusting the token generation rate for the disfavored class at the end of a round-robin scheduling round.

After serving a best-effort class, the scheduler adjusts the token generation rate based on the current arrival and serving rates, as shown in FIG. 8. In a preferred embodiment, the scheduler records the start and end times for each serving round, then calculates the serving rate as the NAD 32 previously calculated the arrival rate. The best-effort scheduler then derives the serving/arrival ratio from the current serving rate and the current arrival rate. Finally, it calculates the token generation rate from the desired arrival rate and the current serving/arrival ratio. This algorithm also works if the scheduler uses the current token generation rate as the current serving rate, adjusting the token generation rate if the arrival rate changes.

As indicated by the FIG. 8 flowchart, the process begins in step 190, and continues in step 192 by setting the end time equal to the current clock time. Then, in step 194, the serving time is set to the end time minus the start time, and in step 196, the current serving rate is calculated. Thereafter, the current serving/arrival ratio is calculated in step 198, and the new token rate is calculated in step 200, after which the process ends in step 202.

In an alternative embodiment, this adjustment algorithm may also be incorporated into FIG. 4 instead of the previously described best-effort scheduling thread, preferably following the adjustment of the current arrival rate. Overall system performance can be improved by avoiding the frequent computation required for the rate adjustment if the adjustment algorithm is implemented in the scheduling thread.

Figure 9:
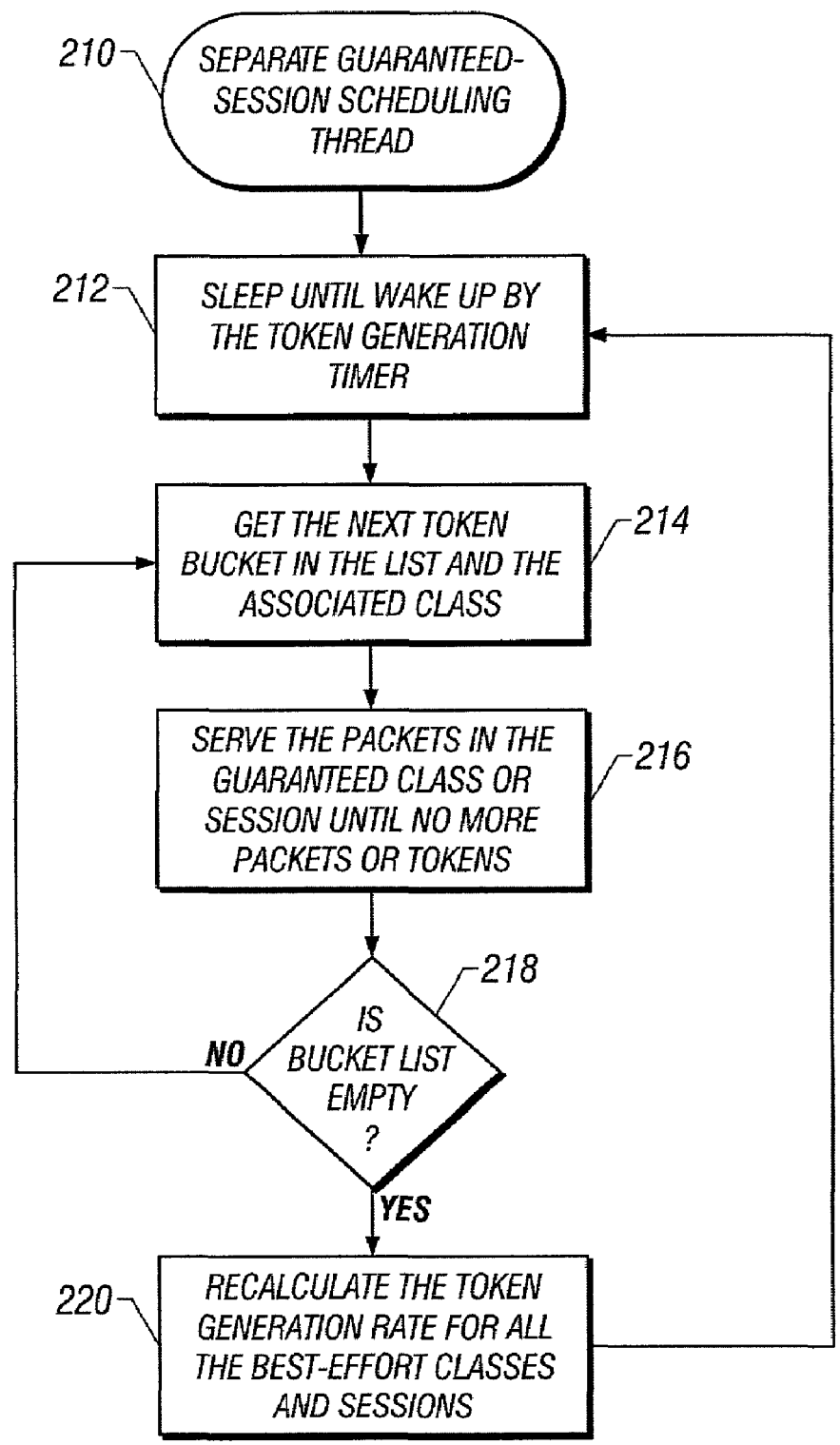
FIG. 9 is a flow chart depicting a preferred process for scheduling favored and disfavored class as utilizing a scheduling thread.

FIG. 9 illustrates a preferred methodology by which the guaranteed scheduler works. As previously discussed, the guaranteed scheduling thread has higher priority than the best-effort scheduling thread. If the guaranteed scheduler has no additional tokens or packets to serve, it may be placed into an inactive status unless and until activated by the token-generation timer (see FIG. 3) or the packet-processing thread (see FIG. 4). After activation, the guaranteed scheduler loops through each bandwidth-guaranteed class and serves its input queue.

As shown in the figure, the guaranteed scheduler moves to the next available guaranteed class if it there are no additional tokens or packets to serve. Before becoming inactive however, the guaranteed scheduler preferably triggers a recalculation of the token generation rate for all of the best-effort classes. It is desirable for the guaranteed scheduler to do this recalculation because the arrival rate of the guaranteed classes may have changed, in which case the desired arrival rates of the best-effort classes may also have changed accordingly. Alternatively, this recalculation may also be performed in FIG. 5 following the adjustment of the arrival rate for current aggregation class. However, this embodiment of the invention preferably performs the recalculation once every serving round in the guaranteed scheduling thread to enhance system performance.

As indicated by the FIG. 9 flowchart, the process begins in step 210 with the guaranteed scheduling thread. It may remain inactive until activated by the token generation timer, as indicated in step 212. Then, in step 214, the NAD 32 obtains the next token bucket in the list and the associated class, and in step 216, data packets in the guaranteed class are served until there are no more packets or tokens. Then, control returns to step 214 if the bucket list is empty in step 218; otherwise control passes to step 220 if the bucket list is not empty. In step 220, the token generation rate for all of the best effort classes and sessions is recalculated, after which control returns to step 212.

Figure 10:
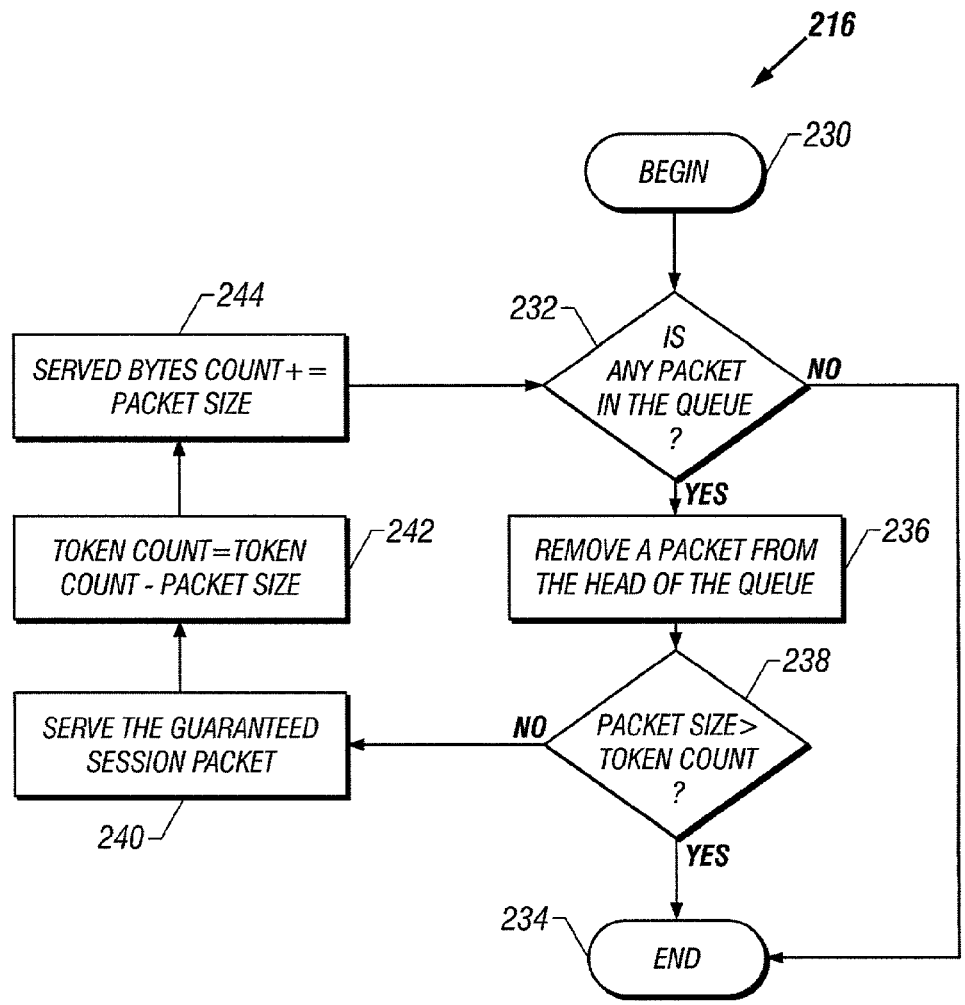
FIG. 10 is a flow chart depicting a preferred process for serving data packets contained in a favorable class.

Finally, FIG. 10 shows the process of serving a bandwidth-guaranteed queue, which is similar in operation to serving the priority queue in the best-effort class. The number of packets to be served is determined by the number of tokens available in the corresponding token bucket, except that classes with guaranteed minimum rates may also be served by the best-effort scheduler.

As indicated by the FIG. 10 flowchart, the process begins in step 230 and continues in step 232 by checking the queue for data packets. If there are no data packets in step 232, control passes to step 234 and the process ends. If there are data packets in step 232, control passes to step 236 in order to remove a packet from the head of the queue. Then, control passes to step 238, afterwhich control passes to step 234 if the packet size is greater than the token count; otherwise, control passes to step 240 to serve the guaranteed session packet, then to step 242 to set the token count to the token count minus the packet size. Then, control passes to step 244 to set the served bytes to the packet size, after which control returns to step 232.

The spirit and scope of the present invention is not limited to any of the various embodiments described above. Rather, the details and features of exemplary and preferred embodiments have been disclosed. Without departing from the spirit and cope of this invention, other modifications will therefore be apparent to those skilled in the art. Thus, it must be understood that the detailed description of the invention and drawings were intended as illustrative only, and not by way of limitation.

What is claimed is:

1. A method for controlling data flow in a multi-user, limited bandwidth networking environment by differentiating data types for disparate processing thereof, said method comprising steps of:
    establishing a plurality of aggregation classes that are hierarchically ordered to include at least one favored class and at least one disfavored class;
    aggregating one or more network sessions into at least one of said plurality of aggregation classes according to a pre-defined aggregation policy;
    asymmetrically allocating bandwidth to said network sessions according to said hierarchically ordering whereby said allocation occurs in accordance with a first algorithm for said favored class and a second algorithm for said disfavored class, said first algorithm controlling a first arrival rate for a first data packet by controlling a first serving rate for said first data packet in accordance with a first serving/arrival ratio, said second algorithm controlling a second arrival rate for a second data packet by controlling a second serving rate for said second data packet in accordance with a second serving/arrival ratio, said favored class including said first data packet and said disfavored class including said second data packet.

2. The method of claim 1 wherein said first algorithm is implemented using a rate-control schedule algorithm.

3. The method of claim 2 wherein said rate-control algorithm is a Token Bucket algorithm.

4. The method of claim 3 wherein said first serving rate correlates to a token bucket in the Token Bucket Algorithm.

5. The method of claim 3 wherein said Token Bucket algorithm utilizes an amount of tokens that corresponds to a packet size of said first data packet.

6. The method of claim 3 wherein a timer callback generates tokens at a constant token generation rate for said plurality of aggregation classes.

7. The method of claim 1 wherein said bandwidth initially correlates to a WAN link bandwidth.

8. The method of claim 1 wherein said first serving/arrival ratio is pre-detemined.

9. The method of claim 8 wherein said first serving/arrival ratio is 0.75.

10. The method of claim 8 wherein said first serving/arrival ratio is 1.0 whereby said first arrival rate corresponds to said first serving rate.

11. The method of claim 1 wherein said second algorithm is implemented using a token bucket to calculate said second serving rate.

12. The method of claim 1 wherein said favored class includes a plurality of favored classes within said favored class.

13. The method of claim 12 wherein said plurality of favored classes includes a bandwidth-guaranteed average rate favored class and a bandwidth-guaranteed minimum rate favored class within said plurality of favored classes.

14. The method of claim 1 wherein said disfavored class includes a plurality of disfavored classes within said disfavored class.

15. The method of claim 14 wherein said second algorithm is implemented using a weighted round-robin scheduler algorithm to allocate bandwidth among said plurality of disfavored classes.

16. The method of claim 14 wherein said second algorithm is implemented using a round-robin scheduler algorithm to allocate bandwidth equally among said plurality of disfavored classes.

17. The method of claim 1 wherein controlling said first serving rate comprises queuing said first data packet for a period of time to inactivate said first data packet within a one of said network sessions, thereby reducing throughput of said network session.

18. The method of claim 1 further comprising a step of: discarding said first packet at a calculated interval to force said first data packet to be retransmitted within said network session, thereby reducing transmission window size of a one of said network sessions.

19. The method of claim 1 wherein said first algorithm and said second algorithm employ treads for managing said network session.

20. A computer-readable storage medium containing computer executable code for instructing a computer to operate as follows:
establish a plurality of aggregation classes that are hierarchically ordered to include at least one favored class and at least one disfavored class;
aggregate one or more network session into at least one of said plurality of aggregation classes according to a pre-defined aggregation policy;
asymmetrically allocate bandwidth to said network sessions according to said hierarchically ordering whereby said allocation occurs in accordance with a first algorithm for said favored class and a second algorithm for said disfavored class, said first algorithm controlling a first arrival rate for a first data packet by controlling a first serving rate for said first data packet in accordance with a first serving/arrival ratio, said second algorithm controlling a second arrival rate for a second data packet by controlling a second serving rate for said second data packet in accordance with a second serving/arrival ratio, said favored class including said first data packet and said disfavored class including said second data packet.

21. The computer-readable storage medium of claim 20 wherein said executable code instructs said computer to implement said first algorithm using a rate-control schedule algorithm.

22. The computer-readable storage medium of claim 21 wherein said executable code instructs said computer to implement said rate-control schedule algorithm using a Token Bucket algorithm.

23. The computer-readable storage medium of claim 22 wherein said executable code instructs said computer to correlate said first serving rate to a token bucket in the Token Bucket algorithm.

24. The computer-readable storage medium of claim 22 wherein said executable code instructs said computer to utilize an amount of tokens that corresponds to a packet size of said first data packet.

25. The computer-readable storage medium of claim 22 wherein said executable code instructs said computer to generate tokens at a constant token generation rate for said plurality of aggregation classes using a timer callback.

26. The computer-readable storage medium of claim 20 wherein said executable code instructs said compute to correlate initial bandwidth with a WAN link bandwidth.

27. The computer-readable storage medium of claim 20 wherein said executable code instructs said computer to predetermine said first serving/arrival ratio.

28. The computer-readable storage medium of claim 27 wherein said executable code instructs said computer to set said first serving/arrival ratio to 0.75.

29. The computer-readable storage medium of claim 27 wherein said executable code instructs said computer to set said first serving/arrival ratio to 1.0 whereby said first arrival rate corresponds to said first serving rate.

30. The computer-readable storage medium of claim 20 wherein said executable code instructs said computer to implement said second algorithm using a token bucket to calculate said second serving rate.

31. The computer-readable storage medium of claim 20 wherein said executable code instructs said computer to include a plurality of favored classes within said favored class.

32. The computer-readable storage medium of claim 31 wherein said executable code instincts said computer to include a bandwidth-guaranteed average rate favored class and a bandwidth-guaranteed minimum rate favored class within said plurality of favored classes.

33. The computer-readable storage medium of claim 20 wherein said executable code instructs said computer to include a plurality of disfavored classes within said disfavored class.

34. The computer-readable storage medium of claim 33 wherein said executable code instructs said computer to implement said second algorithm using a weighted round-robin scheduler algorithm to allocate bandwidth among said plurality of disfavored classes.

35. The computer-readable storage medium of claim 33 wherein said executable code instructs said computer to implement said second algorithm using a round-robin scheduler algorithm to allocate bandwidth equally among said plurality of disfavored classes.

36. The computer-readable storage medium of claim 20 wherein said executable code instructs said computer to queue said first data packet for a period of time to inactivate said first data packet within said network session, thereby reducing throughput of a one of said network sessions.

37. The computer-readable storage medium of claim 20 wherein said executable code instructs said computer to discard said first packet at a calculated interval to force said first data packet to be retransmitted within a one of said network sessions, thereby reducing transmission window size of said network session.

38. The computer-readable storage medium of claim 20 wherein said executable code instructs said computer to employ threads for managing said network session.

* * * * *